Dec. 13, 1938.  R. E. HOLLETT  2,140,132
TRAILER COUPLER
Filed Dec. 9, 1935
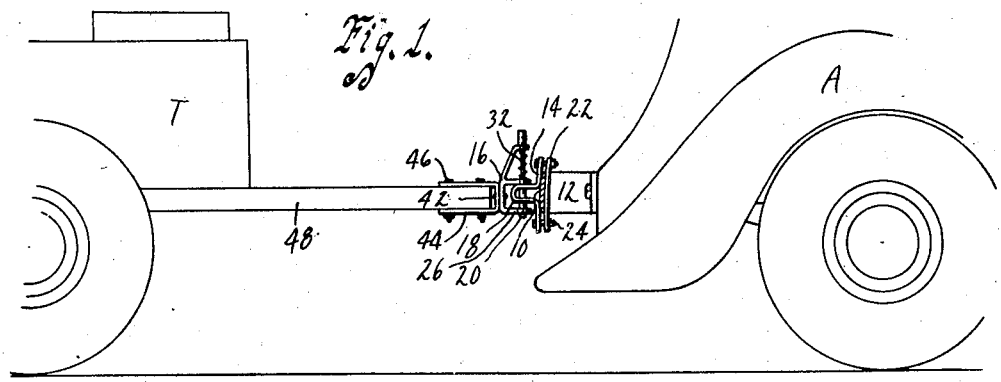
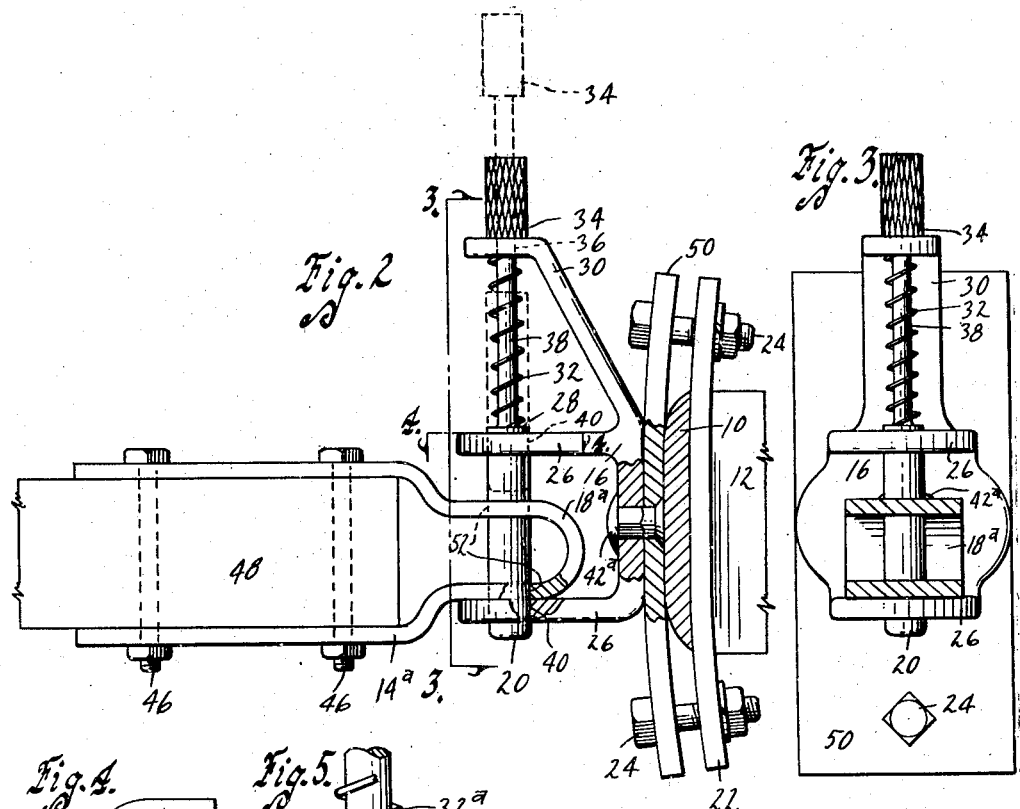
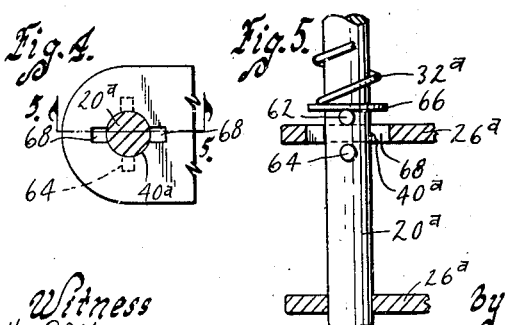
Inventor
Robert E. Hollett
by Bair, Freeman & Sinclair
Attorneys Patented Dec. 13, 1938

2,140,132

UNITED STATES PATENT OFFICE 2,140,132

TRAILER COUPLER

Robert E. Hollett, Des Moines, Iowa

Application December 9, 1935, Serial No. 53,545

2 Claims. (Cl. 280—33.15)

The object of my invention is to provide a trailer coupler, which is simple, durable and comparatively inexpensive to manufacture, and which eliminates the necessity of using nuts, cotter keys or other additional fastening devices.

A further object is to provide a trailer coupler including a clevis-like element, having a coupler pin, a spring being provided to urge the coupler pin to coupling position, so as to normally retain the trailer coupler in operative position.

A further object is to provide means in connection with the coupler pin to prevent removal thereof from the coupling device, so that it can not be lost, yet is always ready for coupling operations.

A further object is to provide a coupling device, comprising a pair of members, each perforated, a coupler pin being slidably and non-removably associated with the perforations of one member and slidably and removably associated with the perforation of the other member.

A further object is to provide a swivel connection in one of the members, so as to take care of twisting of a trailer relative to an automobile or other draft vehicle pulling the trailer.

A still further object is to provide a bayonet pin mechanism for locking the trailer parts together.

With these and other objects in view, my invention consists in the construction, arrangement and combination of the various parts of my trailer coupler, whereby the objects contemplated are attained, as hereinafter more fully set forth, pointed out in my claims, and illustrated in the accompanying drawing, in which:

Figure 1 is a side elevation of a trailer coupler embodying my invention, showing the rear portion of an automobile and the front portion of a trailer to which the coupler has been applied.

Figure 2 is an enlarged, side elevation of a slightly modified type of trailer coupler.

Figure 3 is a sectional view of the line 3—3 of Figure 2, showing details of construction.

Figure 4 is a sectional view on the line 4—4 of Figure 2 showing modified constructions; and Figure 5 is a sectional view on the line 5—5 of Figure 4.

In the accompanying drawing, I have used the reference character A to indicate generally an automobile, and T a trailer.

Automobiles are now ordinarily provided with bumpers and the rear bumper bar of the automobile A is indicated at 10. The supports for the bar relative to the automobile are indicated at 12. The bumper bar 10 provides a convenient projection on the automobile to which my trailer coupler can be attached.

In Figure 1, I illustrate a first coupler member 14 and a second one 16. The member 14 comprises a bar bent to provide a central projecting portion 18, which is perforated to removably receive a coupler pin 20.

The member 14 is clamped on the bumper bar 10 by a clamp bar 22 and clamping bolts 24.

The member 16 is provided with a pair of arms 26, which are perforated to slidably receive the coupler pin 20, which, however, is not entirely removable from the member 16.

The coupler pin is similar to the one shown in Figure 2, which I will now refer to, as it is drawn on a larger scale.

The pin is provided with a shoulder 28 between which and an arm 30 of the member 16 a spring 32 is interposed. The spring urges the pin to coupling position, but its movement is limited by an enlarged head 34, which engages the third arm 30. The arm 30 is perforated as indicated at 36 to slidably receive a reduced portion 38 of the pin 20.

The perforations in the arms 26 are indicated at 40.

The member 16 in Figure 1 is swivelly mounted by means of a bolt or rivet 42 on an attaching device 44, which is bolted by bolts 46 to the trailer tongue 48.

In Figure 2, the parts are reversed, the member 16 being swivelly mounted by a rivet 42a on a bar 50, which is substituted for the member 14 in Figure 1. In Figure 2, a member 14a is the equivalent of the member 14 in Figure 1 and is attached to the trailer tongue 48 by the bolts 46 rather than being attached to the bumper, the member 16 being attached to the bumper as clearly shown. This is simply a reversal of the parts, which in either form of the invention operate in the same manner and which operation will now be disclosed.

The spring 32 normally retains the pin 20 in the coupled position of Figures 1 and 2. The knob or head 34 can be manually engaged for retracting the pin to the dotted position against the action of the spring 32 for coupling and uncoupling purposes. Whenever either the projection 18 in Figure 1 or the equivalent projection 18a in Figure 2 are positioned with respect to the pin so that the pin can enter the perforations 52 therein, then the pin can be released and the coupler will become operative.

The spring normally retains the parts in coupled position without any nuts or other fastening devices, and by shouldering the pin and providing the head 34 the pin is positively retained against displacement from the member 16, so that it can not become lost when the parts are uncoupled.

With the form of invention shown in Figure 1, the member 16 remains with the trailer when it is disconnected from the automobile, while in the form shown in Figure 2, it remains with the automobile.

In Figures 1, 2 and 3 the spring 32 alone is depended upon to retain the clevis pin 20 in coupled position. In Figures 4 and 5 I show a modified construction in which the clevis pin is more positively retained. In this form of the invention, the upper clevis arm 26a is provided with an opening 40a having slot-like extensions 68. The clevis pin 20a is provided with a pair of pins 62 and 64 adaptable for projection through the slots 68, when in registry therewith. A washer 66 is located above the pin 62 against which the spring 32a engages.

In the operation of the clevis pin shown in Figures 4 and 5, the pin 20a may be rotated until the pin 64 is in alinement with the slots 68, whereupon the clevis pin can be raised to the dotted position of Figure 2, for instance. After the coupling operation, the clevis pin can be again permitted to assume a position with the pin 64 below the upper clevis arm 26a, and then the clevis pin can be rotated a quarter turn to the position shown by dotted lines in Figure 4, so that the non-slotted portion of the opening 40a then positively retains the clevis pin against upward disconnecting movement by engagement of the pin 64 with the lower surface of the upper clevis arm.

Either form of the invention is efficient in operation and inexpensive from a manufacturing standpoint.

Some changes may be made in the arrangement and construction of the various parts of my trailer coupler, without departing from the real spirit and purpose of my invention, and it is my intention to cover by my claims, any modified forms of structure or use of mechanical equivalents, which may be reasonably included within their scope.

I claim as my invention,

1. In a trailer coupler, a pair of unitary members, one attached to the rear bumper of an automobile and the other attached to a trailer tongue element, one of said unitary members having a vertically arranged base, means for securing said base in position for pivotal movement on a horizontal axis, a pair of vertically spaced arms projecting horizontally from said base, each arm being perforated, a coupler pin slidable in the perforations of said arms, the other member having a U-shaped rounded end provided with upper and lower legs each having a perforation to receive said coupler pin to reduce the bending moment thereof and formed to a width narrower than the space between the vertically spaced arms so as to readily enter therebetween, a third arm supported on said base and integral therewith, and a spring having one end engaging said coupler pin and its other end engaging said third arm to bias said coupler pin to enter said perforation of said other member when it registers with the path of sliding travel of the coupler pin.

2. In a trailer coupler, a pair of perforated clevis arms, a cylindrical coupler pin slidable in the perforations and adapted to freely rotate therein and means to retain the pin in said perforations comprising a lateral projection on the pin and a notch in the edge of one of said perforations through which said projection may be extended when in registry therewith, the remaining portion of the edge of said perforation retaining said projection against return movement through said notch when the projection is out of registry with the notch and a spring urging said projection to extend through said notch upon such registry and also urging a portion of said pin to resiliently engage said remaining portion of said perforation when there is no such registry for thereby frictionally preventing movement of said projection to registered position.

ROBERT E. HOLLETT.